United States Patent
Carrara et al.

(10) Patent No.: US 8,996,739 B2
(45) Date of Patent: Mar. 31, 2015

(54) ELECTRICITY SYSTEM CONFIGURATION METHOD AND COMPUTER PROGRAM FOR INTELLIGENT ELECTRONIC DEVICES (IEDS) CONFIRGURED FOR DYNAMIC OR STATIC MODES VIA CONVERTED DESCRIPTION FILE

(75) Inventors: Cristina Carrara, Genoa (IT); Pietro Danelli, Genoa (IT)

(73) Assignee: ABB Technology AG, Zurich (CH)

( * ) Notice: Subject to any disclaimer, the term of this patent is extended or adjusted under 35 U.S.C. 154(b) by 15 days.

(21) Appl. No.: 13/571,747

(22) Filed: Aug. 10, 2012

(65) Prior Publication Data

US 2013/0031340 A1 Jan. 31, 2013

Related U.S. Application Data

(63) Continuation of application No. PCT/EP2010/051898, filed on Feb. 16, 2010.

(51) Int. Cl.
  G06F 13/00 (2006.01)
  G01R 21/133 (2006.01)
  G06F 3/00 (2006.01)
  H04L 12/24 (2006.01)

(52) U.S. Cl.
  CPC .......... *H04L 41/0803* (2013.01); *Y04S 40/162* (2013.01)
  USPC .......... 710/8; 710/9; 710/10; 710/41; 710/62; 702/118; 702/62; 713/1; 713/2; 713/100

(58) Field of Classification Search
  USPC ...................... 710/8–10, 14–19; 700/83, 295; 702/112, 118
  See application file for complete search history.

(56) References Cited

U.S. PATENT DOCUMENTS 7,356,422 B2 * 4/2008 Schweitzer, III ............... 702/60
(Continued)

FOREIGN PATENT DOCUMENTS

WO   WO 2010/003724 A2   1/2010

OTHER PUBLICATIONS

"Designing IEC 61850 system for maintenance, retrofit and extenstion," Dr. Wolfgang Wimmer, ABB, Spring 2008, PAC World article, pp. 1-7, http://www.abb.com/substationautomation.*
International Search Report (PCT/ISA/210) issued on Feb. 19, 2012, by the European Patent Office as the International Searching Authority for International Application No. PCT/EP2010/051898.

(Continued)

*Primary Examiner* — Tammara Peyton
(74) *Attorney, Agent, or Firm* — Buchanan Ingersoll & Rooney PC (57) ABSTRACT

A method for configuring an electricity system including providing a first programmable electronic device, providing a further programmable electronic device adapted to communicate with the first programmable electronic device and configurable according to a first communication configuration mode which is dynamic or a static, providing a first configuration description file defining communications between the first and further programmable electronic devices according to a second communication configuration mode opposite to the first mode, and processing via computer the first file to convert it into a converted configuration description file defining communications configuration between the first and further programmable electronic devices according to the first mode.

22 Claims, 5 Drawing Sheets

(56) References Cited

U.S. PATENT DOCUMENTS

| | | | |
|---|---|---|---|
| 8,265,908 B2* | 9/2012 | Kirrmann et al. | 702/188 |
| 8,718,959 B2* | 5/2014 | Smit | 702/59 |
| 2008/0127210 A1* | 5/2008 | Bosold et al. | 719/313 |
| 2008/0244044 A1* | 10/2008 | Wimmer | 709/221 |
| 2009/0076762 A1* | 3/2009 | Vetter et al. | 702/122 |
| 2012/0099478 A1* | 4/2012 | Fu et al. | 370/254 |
| 2012/0226386 A1* | 9/2012 | Kulathu et al. | 700/295 |
| 2012/0239170 A1* | 9/2012 | Kulathu et al. | 700/83 |

OTHER PUBLICATIONS

Written Opinion (PCT/ISA/237) issued on Feb. 19, 2012, by the Japanese Patent Office as the International Searching Authority for International Application No. PCT/EP2010/051898.

Heiko Englert et al., IEC 61850 Substation to Control Center Communication—Status and Practical Experiences from Projects, 2009 IEEE Bucharest Power Tech Conference, Jun. 28-Jul. 2, 2009, Bucharest Romania, pp. 1-6.

* cited by examiner

ELECTRICITY SYSTEM CONFIGURATION METHOD AND COMPUTER PROGRAM FOR INTELLIGENT ELECTRONIC DEVICES (IEDS) CONFIRGURED FOR DYNAMIC OR STATIC MODES VIA CONVERTED DESCRIPTION FILE

RELATED APPLICATION

This application is a bypass continuation application under 35 U.S.C. §120 of International application PCT/EP2010/051898 filed on Feb. 16, 2010 designating the U.S., the content of which is hereby incorporated by reference in its entirety.

FIELD

The present disclosure relates to an electricity system, such as a method of configuring electronic devices operating in an electricity or automation system.

BACKGROUND INFORMATION

Electricity systems (e.g. electrical generation and distribution systems) can be provided with a plurality of intelligent electronic devices (IEDs). An IED is a microprocessor-based electronic device, for example an electronic relay, which performs various functions including, but not limited to, protection, monitoring, control, and automation of an associated portion of the system. IEDs may be associated with supervisory control and data acquisition systems, energy management systems, distribution management systems, distribution automation systems, and teleprotection systems for power systems.

Since there was a desire to more easily network these IEDs together and, in essence, merge the varying communication capabilities of these different IEDs, the International Electrotechnical Commission (IEC) instituted a standard for Communication Networks and Systems in Substations. This standard is commonly known as and is defined in the IEC 61850 standard. Although it is described to be applicable to substation automation systems (SAS), IEC 61850 may be applied across any portion or the entire electricity system. In addition to being a communication standard, IEC 61850 further covers, application data modelling and configuration management.

The IEC 61850 standard defines also a specific configuration language which allows users to exchange device subsystem, system descriptions and system parameters among different IED configuration tools. This language is referred to as a Substation Configuration Language (SCL) and is based on extensible Markup Language (XML).

The configuration of the communications among the IEDs can be made by software tools, e.g., the Substation Configuration Tool SCT, which allows an operator to fully design the system and from which the configuration of the same can be performed. Files, such as Substation Configuration Description SCD files, contain a description of the communication details of an IED among all the IEDs in a system or in a subsystem.

The communication between the IEDs is connection oriented (e.g., a client-server communication) for non-time critical messages, via MMS (Manufacturing Message Specification) as Application Layer of a communication stack built on TCP/IP/Ethernet, or packet based for time critical messages, via so called Generic Object Oriented Substation Events (GOOSE), a multicast at Data Link (Ethernet) level. In connection with the MMS non-time critical transactions (i.e. monitoring data and/or command exchanges) between a sender IED (e.g., a server IED) and a recipient (e.g., a client), two different communication configuration modes are known: a dynamic configuration mode and a static configuration mode.

According to the static configuration mode, the identifiers of the client IEDs are explicitly indicated and stored in server IED configuration information.

According to the dynamic configuration mode, the identifiers of the recipients IEDs are not indicated and stored in the server IED configuration information, but said identifiers can be determined by means of a list stored in the client IED configuration information.

With reference to the configuration of communication aspects of an IED, there are situations in which an IED provided by a company cannot accept a communication configuration mode which is employed by other IEDs which are provided by a different company.

Known configuration tools are not suitable to overcome in an efficient manner the communications configuration incompatibility of electronic devices adopting different communication configuration modes.

SUMMARY

An exemplary method for configuring an electricity or automation system is disclosed. The method comprising: providing a first programmable electronic device; providing a further programmable electronic device adapted to communicate with the first programmable electronic device and configurable according to a first communication configuration mode which is dynamic or a static; providing a first configuration description file defining a second communication configuration mode between the first programmable electronic device and said further programmable electronic device, said second communication configuration mode being opposite to the first mode; converting via a computer, the first configuration description file into a converted configuration description file defining communication configurations between the first programmable electronic device and said further programmable electronic device according to the first communication configuration mode.

An exemplary computer program product is disclosed. The computer program product configured to be in communicable contact with least one computer and having software code portions recorded thereon which when executed by the at least one computer the software code portions causes the computer to execute a method comprising: acquiring a first configuration description file defining communications between a first programmable electronic device and a further programmable electronic device of an electricity system according to a first communication configuration mode which is dynamic or a static; processing the first file to convert it into a converted configuration description file defining communications configuration between the first and further devices according to a second mode opposite to the first mode.

BRIEF DESCRIPTION OF THE DRAWINGS

Further characteristics and advantages will be more apparent from the following description of exemplary embodiment and of its alternatives given as a way of an example with reference to the enclosed drawings in which.

DETAILED DESCRIPTION

Figure 1:
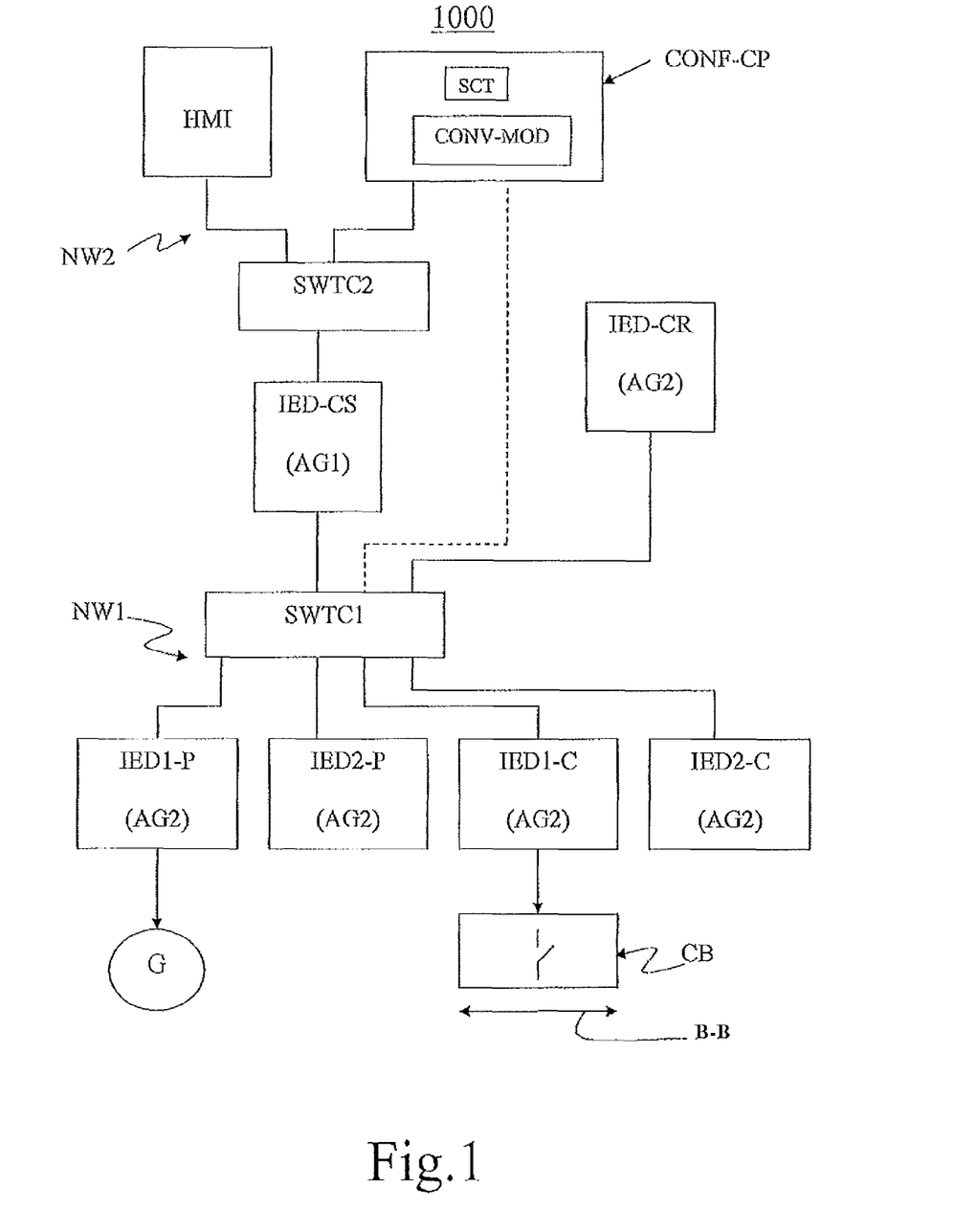
FIG. 1 shows schematically an electricity system in accordance with an exemplary embodiment of the present disclosure.

FIG. 1 shows schematically an electricity system in accordance with an exemplary embodiment of the present disclosure. Namely, FIG. 1 shows schematically an embodiment of an electricity system 1000, such as an electrical generation, transmission or distribution system or substations thereof. The electricity system 1000 is an electrical system where power is generated, and then a generator output voltage is adapted to a suitable level of transmission and distribution substations. The electrical system 1000 includes primary devices such as electrical cables, lines, bus bars, switches (breakers or disconnectors), power transformers and instrument transformers which can be arranged in switch yards and/or bays (not shown). These primary devices are operated in an automated way via an Automation System (AS) responsible for controlling, protecting, measuring and monitoring of said primary devices.

The Automation System (AS) of the electrical system 1000 includes a plurality of programmable electronic devices such as the so called intelligent electronic devices (IEDs) which perform various functions including, but not limited to, protection, monitoring, control, and automation of an associated portion of the power system.

In accordance with an exemplary embodiment described herein, the plurality of intelligent electronic devices includes a first protection device IED1-P, e.g. a relay, having a protection functionality of one of the primary devices (e.g. a voltage generator G) of the electrical system 1000. According to an example, at least a second protection device IED2-P is provided.

Moreover, the plurality of intelligent electronic devices of the electrical system 1000 includes a first control unit IED1-C having the functionality of controlling another primary device (e.g. circuit breaker CB connecting the generator G to a bus bar B-B) of the electrical system 1000. According to the example given, at least a second control unit IED2-C can be provided.

The first protection device IED1-P, the second protection device IED2-P, the first control unit IED1-C and the second control unit IED1-C are connected to each other by a first switch SWTC1 into a communication network NW1.

To this first network NW1 further intelligent electronic devices such as a controller apparatus IED-CR and a connectivity server IED-CS may be connected. The controller apparatus IED-CR has the function of managing and coordinating the operations of the other IEDs included in the automation system (AS) controlling the electrical system 1000 while the connectivity server IED-CS has pure communication functions, as it will be better clarified later.

The connectivity server IED-CS is connected by means of a second switch SWTCH2 to a second network NW2 including a Human-Machine Interface HMI, such as a personal computer, which allows a user to interact with the intelligent electronic devices of the electrical system 1000. The second network NW2 can be a LAN (Local Area Network), further including suitable physical communication channels, switches and routers (not shown).

Moreover, the electrical system 1000 includes a configuration computer CONF-CP, which is, as an example, included in the second network NW2 and allows performing the configuration of the electrical system 1000 by a software configuration tool module SCT. The configuration computer CONF-CP also includes a conversion software module CONV-MOD resident in a memory of the configuration computer CONF-CP. However, configuration of the IEDs can be performed by more than one computer or by means of other computers connected to the first network NW1 and/or connectable to each single IEDs of the electrical system 1000.

The communication between the above listed devices and apparatuses is connection oriented (e.g., a client-server communication) for non-time critical messages, via MMS (Manufacturing Message Specification) as Application Layer of a communication stack built on TCP/IP/Ethernet, or packet based for time critical messages, via for example Generic Object Oriented Substation Events (GOOSE), a multicast at Data Link (Ethernet) level.

Moreover, according to an exemplary embodiment of the present disclosure, the first protection device IED1-P, the second protection device IED2-P, the first control unit IED1-C and the second control unit IED1-C are compliant with the standard IEC 61850. According to this example, the first switch SWTCH1 is an IEC 61850 compliant switch.

As known to the skilled in the art, the standard IEC 61850 defines a specific configuration language which allows users to exchange device descriptions and system parameters among configuration tools of different intelligent electronic devices, IEDs. This language is referred to as a Substation Configuration Language (SCL) and is based on extensible Markup Language (XML).

An IED is considered to be compliant with the standard IEC 61850 if it is accompanied either by an SCL file describing its capabilities, or by a tool, which can generate this file from the IED, and can directly use a system SCL file to set its communication configuration, as far as a setting is possible in the IED, or it is accompanied by a tool which can import a system SCL file to set these parameters to the IED.

Referring back to the connectivity server IED-CS, it manages communications between the IEDs devices of the first communication network NW1 and the apparatuses of the second communication network NW2, such as the Human-Machine Interface HMI.

The connectivity server IED-CS can operate as a client (according to the IEC 61850 standard) by collecting data from the IEDs of the first communication network NW1 and issuing commands to the IEDs of the first communication network NW1, converts said data/commands in OPC (OLE for Process Control) format, operates as an OPC server making available the converted data to the second communication network NW2, receiving commands from it and forwarding them to the first network NW1.

With reference to SCL language, the standard IEC 61850 defines the following four types of SCL files: IED Capability Description (ICD) files, System Specification Description (SSD) files, Substation Configuration Description (SCD) files, and Configured IED Description (CID) files.

SCD file contains all IEDs descriptions, a communication configuration section and a substation description section. The other configuration files above mentioned (ICD, SSD and CID have other functions in the configuration workflow described by the standard IEC 61850, well known to the skilled in the art.

According to an exemplary embodiment described herein, the connectivity server IED-CS is adapted to accept an SCD file defining the transactions according to a static configuration mode while the other IEDs are adapted to accept an SCD file defining the transactions according to a dynamic configuration mode.

This exemplary situation can refer to any of a number of situations in which the connectivity server IED-CS is provided by a first agent or company AG1 employing static mode while the first protection device IED1-P, the second protection device IED2-P the first control unit IED1-C, the second control unit IED1-C and the controller apparatus IED-CR are provided by a second agent or company AG2 employing dynamic mode.

These two different communication configuration modes refer to the modality of describing configuration details defining data transactions between an IED having a server function (e.g., sender IED) and further IEDs having a client function (e.g., recipient IEDs).

According to an exemplary static configuration mode, the identifiers of the client to which data have to be provided by a server IED are explicitly indicated and stored in the server IED configuration information.

According to a dynamic configuration mode, the identifiers of the client IEDs are not indicated and stored in the server IED configuration information but said identifiers can be determined by means of a list of the received data items stored in the client IED configuration information indicating the type of the data which can be received by the client IEDs from the server IEDs.

In accordance with the described example, the configuration information of an IED is stored in a section of the SCD file describing the data exchange among IEDs. According to the described example, static and dynamic configuration modes are definitions which refer to the connection oriented communication employed for transactions associated with non-time critical messages, e.g., via MMS as Application Layer of a communication stack built on [-OSI/-]TCP/IP/Ethernet, communication stack built on OSI/TCP/IP/Ethernet. In this case, the IED identifiers are addresses defined in the Application Layer of the OSI reference model.

Moreover, in accordance with an exemplary embodiment of the present disclosure, the second agent AG2, which provides all the IEDs, except the connectivity server IED-CS, also provides one or more SCD files defining communication aspects for all the devices included in the electrical system 1000. This SCD file of the second agent AG2 includes a section describing communication configuration details of the connectivity server IED-CS, even if this connectivity server has been provided by the first agent AG1. Therefore, an SCD file section describing inter alia the transaction configuration details of the connectivity server IED-CS according to a dynamic mode is available, while the connectivity server IED-CS is adapted to accept SCD file sections based on the static mode.

It is observed that in the above described scenario, a configuration of the IEDs included in the electrical system 1000 made according to known methods can be complex and could result in an incorrect configuration having consequences on the interoperability of the IEDs.

According to a another exemplary embodiment, the first agent AG1 provides two separated SCD files, one related to the IEDs having protection functions and the other to the IEDs having controlling functions. The following SCD files are made available a first file SCD1 relating to the first protection device IED1-P, the second protection device IED2-P, the controller apparatus IED-CR and the connectivity server IED-CS; a second file SCD2 relating to the first control unit IED1-C, the second control unit IED1-C, the controller apparatus IED-CR, and the connectivity server IED-CS.

Figure 2:
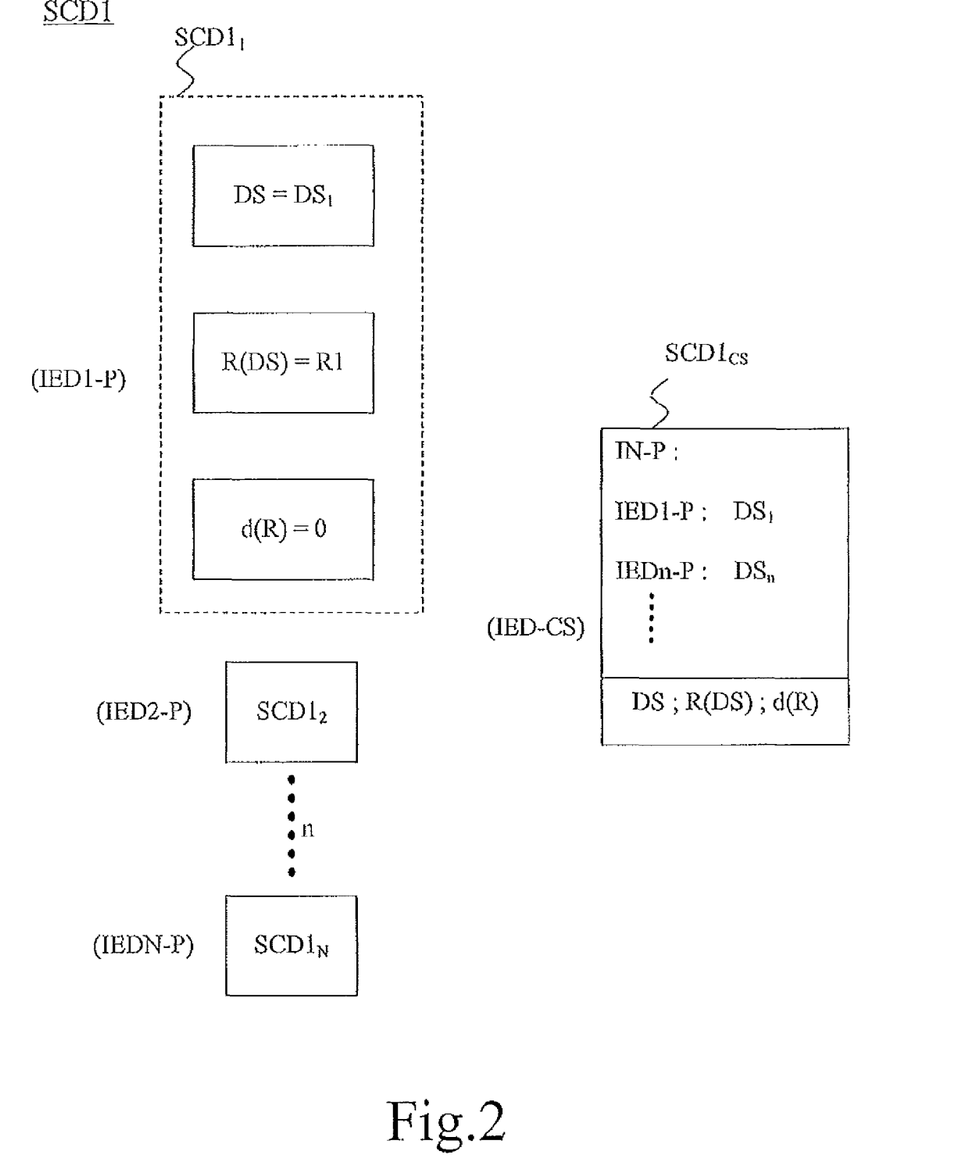
FIG. 2 shows schematically a graphic representation of an example of data exchange among IEDs as described in a Substation Configuration Description file in accordance with an exemplary embodiment of the present disclosure.

FIG. 2 shows schematically a graphic representation of an example of data exchange among IEDs as described in a Substation Configuration Description file in accordance with an exemplary embodiment of the present disclosure. Namely, FIG. 2 shows schematically a graphic representation of the section of the first file SCD1, where data exchange among IEDs is described, which includes a plurality of sections $SCD1_1$-$SCD1_N$ each one associated to the corresponding protection device $IED_{1-:-N}$ and another section $SCD1_{CS}$ associated to the connectivity server IED-CS. The section of the second file SCD2, which is not illustrated, is analogous to the first file schematically shown in FIG. 2.

In this example, reference is made to a communication transaction in which the first protection device IED1-P operates as a server and the connectivity server IED-CS operates as client, in accordance with the IEC 61850 standard behavior. Moreover, as indicated above, the first file SCD1 defines inter alia the communication transactions between the first protection device IED1-P1 and the connectivity server IED-CS in accordance with a dynamic communication configuration mode.

A first section $SCD1_1$ of the first file SCD1 refers to the first protection device IED1-P and includes the following fields: a Data Set field DS, a Data Set Report field R(DS) and a Report Destination field d(R), which is empty "Ø".

In the Data Set field DS the name of the data to be transmitted is indicated (DS=DS1). As an example the data item DS1 can represent a breaker position or values of a measured electrical current or voltage to be provided to the Human-Machine Interface HMI by the connectivity server IED-CS.

The Data Set Report field, R(DS), indicates how the above data of the Data Set field have to be transmitted, e.g., reported. As an example, the Data Set Report field specifies that such data have to be transmitted periodically, at any variation of the measured value or at any variation of the quality of the measured values. This modality has been represented in FIG. 2 by the modality R1.

The Report Destination field d(R) of the first section $SCD1_1$ does not include any identifiers of clients since a dynamic mode is assumed. Further sections $SCD1_2$-$SCD2_N$ of the first file SCD1 refers to further IEDs (not shown in FIG. 1) and are analogous to the ones shown in FIG. 2.

A second section $SCD1_{CS}$ (FIG. 2) of the first file SCD1 refers to the connectivity server IED-CS and includes a list INP of the inputs, i.e. of the data items that can be received by the connectivity server IED-CS from the IEDs on the network NW1.

For example, the list indicates that the connectivity server IED-CS can receive from the first protection device IED1-P data relating to a breaker position or values of a measured electrical current or voltage (e.g., the DS1 item). Analogously, said list indicates that the connectivity server IED-CS can receive from an $n^{th}$ protection device IEDn-P further data DSn.

The second section SCD1$_{CS}$ of the first file SCD1 may also include a Data Set field DS, a Data Set Report field R(DS) and a Report Destination field d(R). In the case of connectivity server IED-CS the above fields are absent, since the IED-CS plays only the role of an IEC 61850 Client. Such fields are present in the case of the controller apparatus IED-CR which can have both the role of a IEC 61850 Client and the role of a IEC 61850 Server on the first network NW1, like the first protection device IED-1P.

As it is clear to the skilled in the art, the first file SCD1 and the second file SCD2 can be obtained by configuring the corresponding subsystems represented by IED-NP (protection IEDs) and IED-NC (control IEDs) from the software tool "SCT", Substation Configuration Tool. The Substation Configuration Tool is an example of a software application tool compliant with the IEC 61850 standard, which allows an operator to fully design the electrical system 1000 and from which the configuration of the same can be performed.

Figure 3:
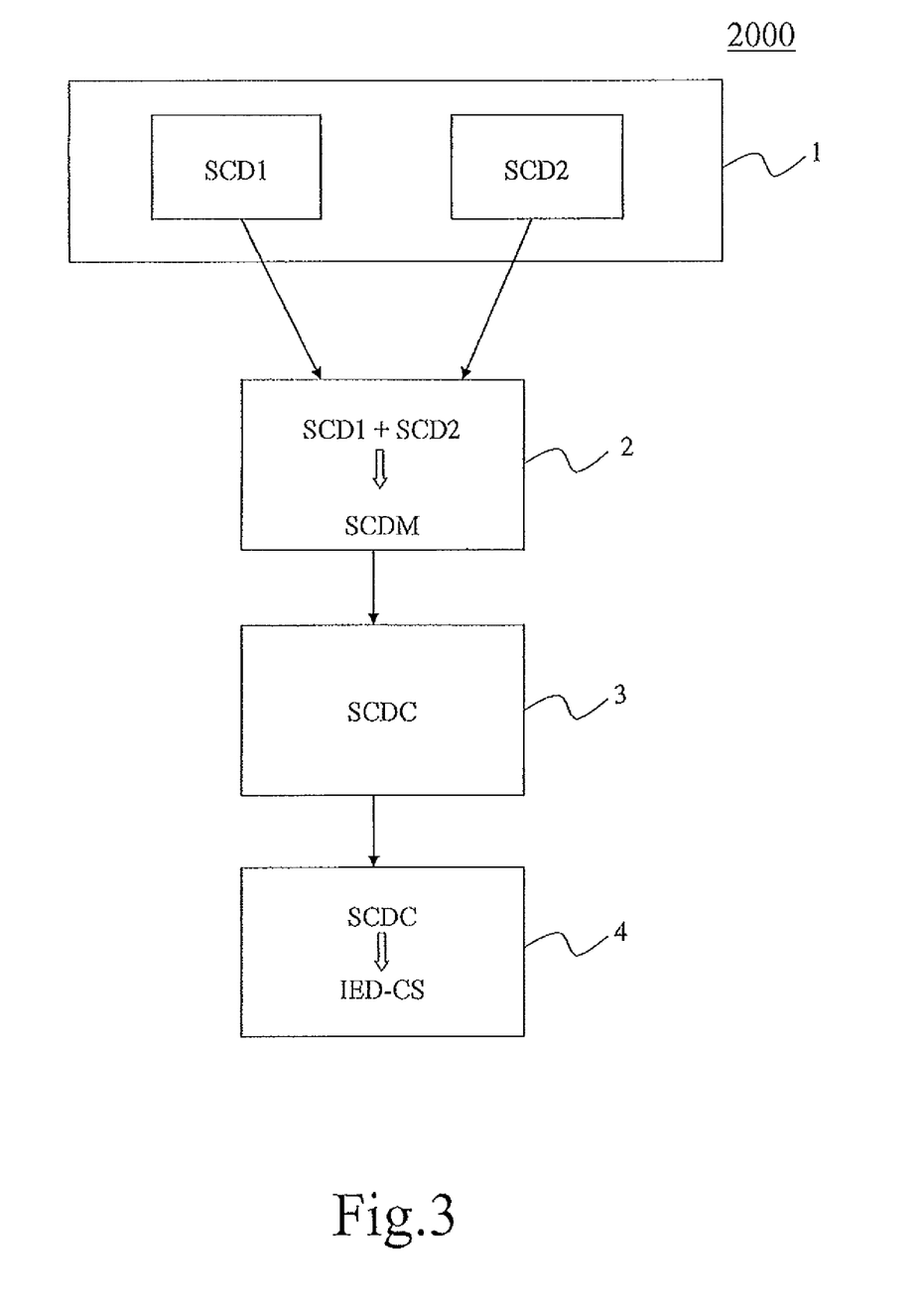
FIG. 3 illustrates a flow chart showing an example of a method of configuring said electricity system in accordance with an exemplary embodiment of the present disclosure.

FIG. 3 illustrates a flow chart showing an example of a method of configuring said electricity system in accordance with an exemplary embodiment of the present disclosure. Namely, FIG. 3 illustrates a flow chart 2000 showing an example of a method of configuring the electrical system 1000 and, the connectivity server IED-CS, in accordance with the scenario above indicated. In an exemplary embodiment, the configuration method refers to the configuration of the devices included in the Automation System (AS) of the electricity system 1000.

This configuration method can be performed by means of any suitable computer such as the configuration computer CONF-CP, shown in FIG. 1 and, as an example, included in the second network NW2. In a first step 1, the above defined first file SCD1 and second file SCD2 are generated by the software tool SCT which, as an example, runs on the configuration computer CONF-CP.

Said first SCD1 and second SCD2 files are then provided to the conversion software module CONV-MOD which according to this example, runs on the configuration computer CONF-CP.

In a second step 2, a merging of the first file SCD1 and second file SCD2 is performed by the conversion software module CONV-MOD which generates a merged file SCDM. This merging processing provides a single SCD file describing configuration communication aspects of the connectivity server IED-CS with the other IEDs of the electrical system 1000 and therefore, in accordance with the sample, with the first protection device IED1-P, the second protection device IED2-P, the controller apparatus IED-CR, the first control unit IED1-C, the second control unit IED1-C.

The merging processing of the second step 2 allows expressing the descriptions included in the two separated files SCD1 and SCD2 in a compact description, thus avoiding that equal portions of the descriptions associated with the connectivity server IED-CS and present in both SCD1 and SCD2 files are included twice.

Figure 4:
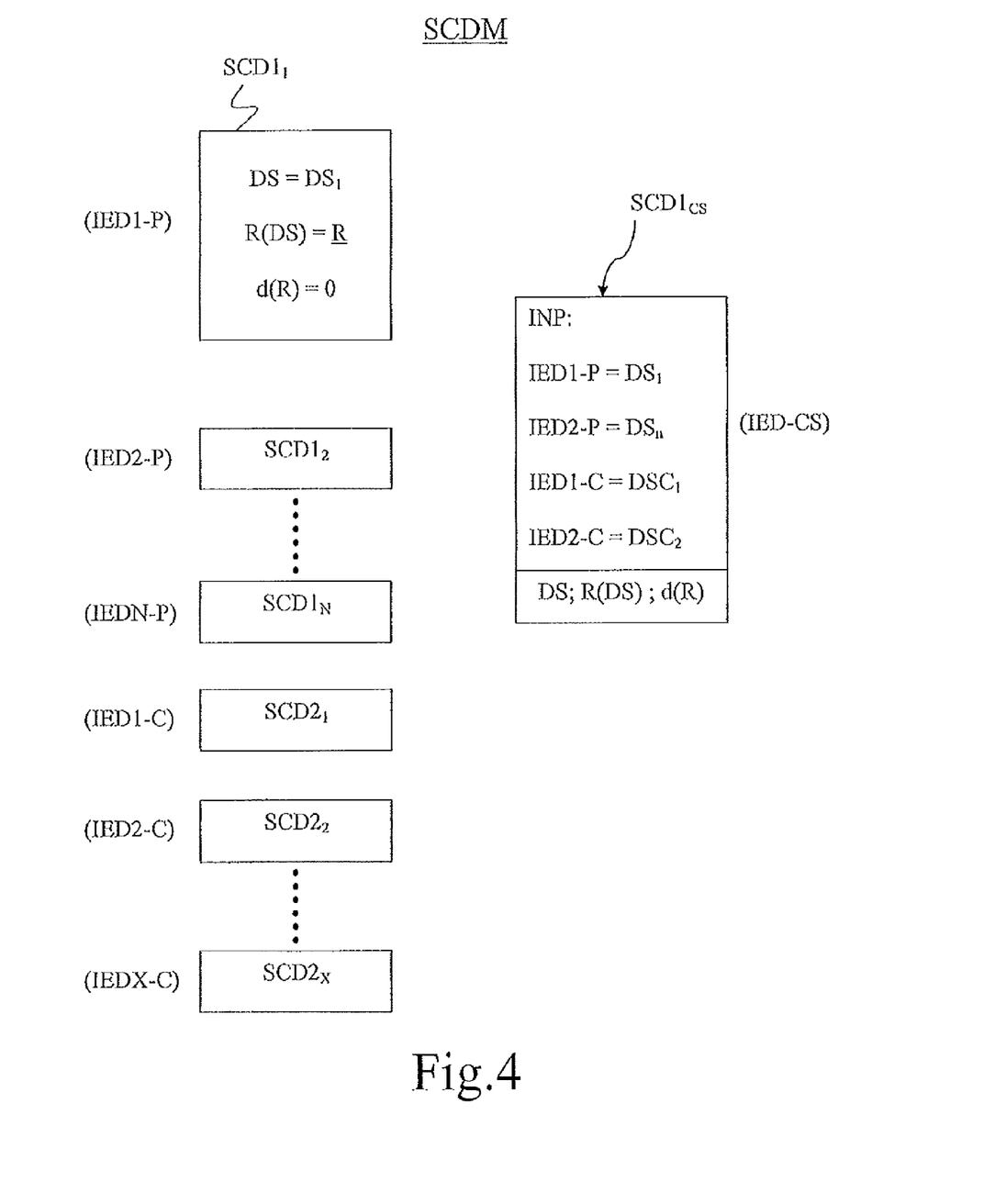
FIG. 4 shows an example of data exchange among IEDs as described in a Substation Configuration Description file resulting from a merging processing of two Substation Configuration Description files in accordance with an exemplary embodiment of the present disclosure.

FIG. 4 shows an example of data exchange among IEDs as described in a Substation Configuration Description file resulting from a merging processing of two Substation Configuration Description files in accordance with an exemplary embodiment of the present disclosure. Namely, FIG. 4 shows an example of the merged file SCDM which includes the second section SCD1$_{CS}$ above described with reference to the first file SCD1 (FIG. 2). Moreover, as a consequence of the merging, in the inputs list INP (FIG. 4) of the second section SCD1$_{CS}$ (concerning the connectivity server IED-CS) further data sets DSC1 and DSC2 have been added which refer to the data to be received from the first and second control units IED1-C and IED2-C.

It is observed that the merged file SCDM still defines transactions of the connectivity server IED-CS with the other IEDs of the electrical system 1000 according to a dynamic mode as the first SCD1 and second SCD2 files do. Therefore, the connectivity server IED-CS of FIG. 2, which accepts SCD files defining configuration transactions according to a static mode, cannot be configured employing the merged file SCDM.

Figure 5:
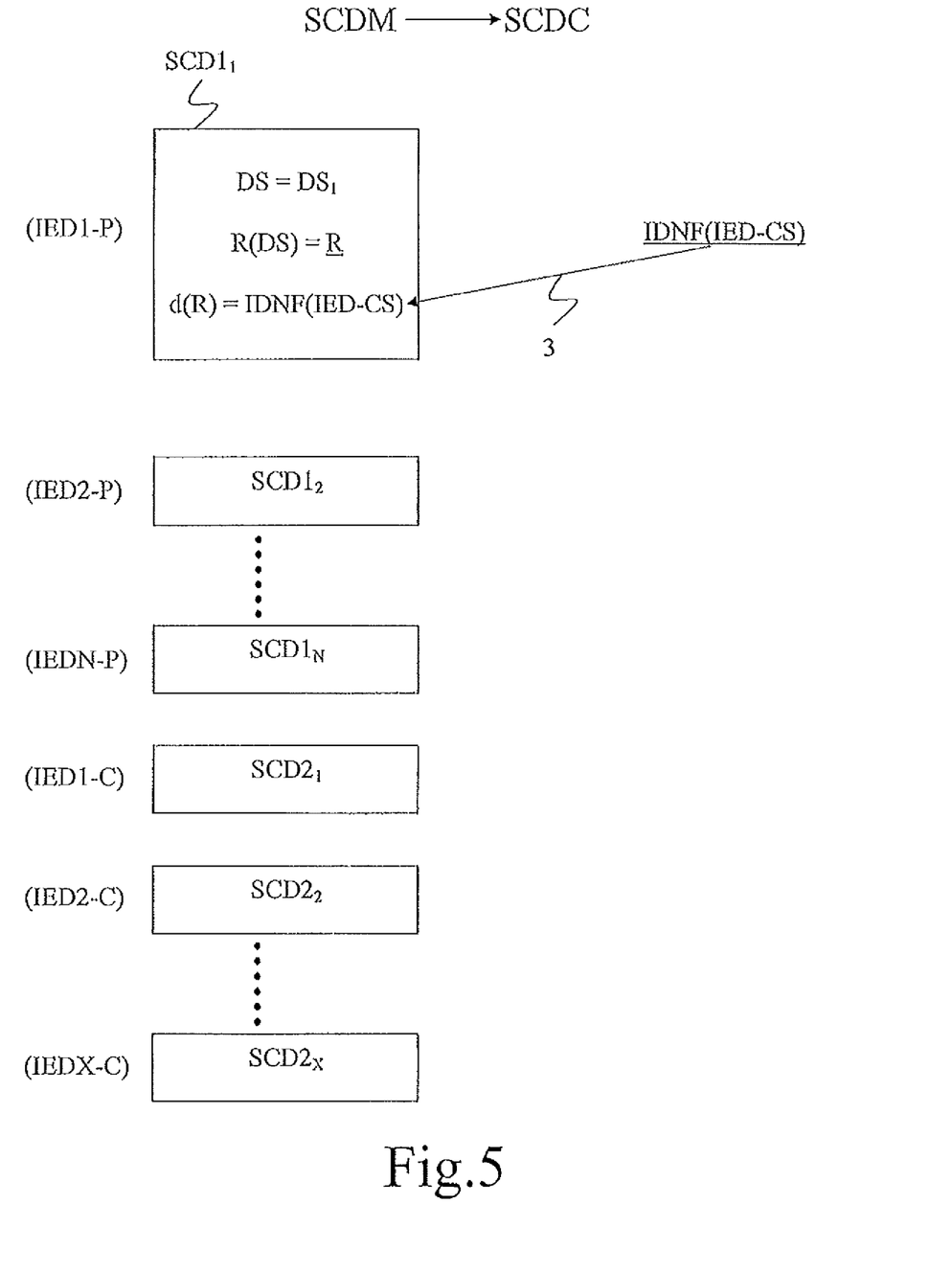
FIG. 5 shows an example of data exchange among IEDs as described in a Substation Configuration Description file resulting from a conversion processing of said Substation Configuration Description file resulting from the merging processing in accordance with an exemplary embodiment of the present disclosure.

Referring again to FIG. 3, in a third step 3, the conversion software module CONV-MOD performs a conversion processing of the merged file SCDM from the dynamic mode to the static mode and provides a converted file SCDC (FIG. 5). According to this third step 3, the merged file SCDM is converted so as to generate the converted file SCDC which is an SCD file defining configuration transactions of the connectivity server IED-CS with the other IEDs according to a static mode.

FIG. 5 shows an example of data exchange among IEDs as described in a Substation Configuration Description file resulting from a conversion processing of said Substation Configuration Description file resulting from the merging processing in accordance with an exemplary embodiment of the present disclosure. As shown in FIG. 5 and in accordance with the example of FIG. 4, the conversion performed in the third step 3 operates on the merged file SCDM by inserting the identifier IDNF(IED-CS) of the connectivity server IED-CS in the Report Destination field d(R) associated with the Data Set DS=DS1 of the first file SCD1. As an example, the identifier contained in the Report Destination field d(R), according to IEC 61850, has the format IEDName/LogicalDeviceName/LogicalNodeName which has the form of a sequence of characters which univocally identifies each IED within the electrical system 1000.

Moreover, as schematically shown in FIG. 5, according to the conversion processing of the merged file SCDM the list of input field INP is removed because this list is not necessary any more in accordance with a static mode of configuration.

The converted file SCDC is then employed (fourth step 4, FIG. 3) for the configuration of the communication aspects or characteristics of the connectivity server IED-CS. The connectivity server IED-CS can be provided with an interpreter software adapted to perform the configuration of communication aspects starting from the converted file SCDC.

The first protection device IED1-P, second protection device IED2-P, the controller apparatus IED-CR, the first control unit IED1-C and the second control unit IED2-C and the other devices of the electrical system 1000 can be configured in a traditional manner, e.g., using a specific software tool SCT based or not based on the first file SCD1 and the second file SCD2.

Moreover, it is noted that the first protection device IED1-P, second protection device IED2-P, the controller apparatus IED-CR, the first control unit IED1-C and the second control unit IED2-C and the other intelligent devices of the electrical system 1000 are adapted to operate with the connectivity server IED-CS independently from the fact that it is configurable in dynamic mode or static mode.

It is observed that according to another embodiment, in the first step 1 a single SCD file describing the transaction configuration according to the a dynamic mode for all the IEDs included in the electrical system 1000 can be provided. In this case, the merging processing of second step 2 can be avoided and the conversion processing of the third step 3 is directly applied to the first file SCD1.

Moreover, it has to be noticed that the teachings of the present description can be also applied to a scenario wherein the device is adapted to accept a transaction configuration according to the static mode is not the connectivity server IED-CS but it is another device, such as the controller apparatus IED-CR or another IED. Further, the described method can be applied to a situation where more than one IED should have an SCD file defining transaction according the static mode. As an example, the conversion processing of the third step 3 can be performed not only for the connectivity server IED-CS but also for a redundant connectivity server, the controller apparatus IED-CR and at least another IED. In addition, the conversion software module CONV-MOD can also be structured to perform conversion from static to dynamic mode.

Moreover, the exemplary conversion method described herein is also applicable to programmable electronic devices which interact using a protocol different from the one defined by the IEC 61850 standard, e.g. provided that such different standard has a comparable abstract approach to the communication service definition.

As is clear from the above description, the exemplary configuration method of the exemplary embodiments of the present disclosure allows the incompatibility configuration conditions associated with different approach of the communication configurations adopted by different companies for their IEDs to be overcome in an efficient manner. The use of the computer program (e.g., a software) above described for electronically processing SCD files describing transactions configuration avoids the use of complex manual manipulations of such files to be performed by operators; such manual manipulations are time consuming and do not ensure an errorless results.

As a dimensional example, an electricity system 1000 of medium size is considered. Such system can be the automation of the set of Medium Voltage Auxiliary Services for a 300 MW to 1000 MW Coal Power Generation Blocks, for example.

This electricity system shows a merged file SCDM which may include 50-250 protection devices and or control devices (according to one real case, 196 protection/control devices are included); 2-8 connectivity servers (according to one real case, 8 connectivity servers are included); 2-8 controller apparatuses (according to one real case, 8 controller apparatuses are included).

Each control/protection device may include at least 1-3 Data Set Report fields R(DS). Therefore, the estimation of the amount of the Report Destination fields d(R) associated with the Data Set Report fields R(DS) to be processed lies in the following range:

{50*1}-{258*3}={50}-{764}

The above described example clearly shows how the described configuration method allows saving engineering and configuration time and reducing costs of engineering.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method for configuring an electricity or automation system, the method comprising:

providing a first programmable electronic device in a first network;

providing a further programmable electronic device adapted to communicate with the first programmable electronic device and configurable according to a first communication configuration mode which is dynamic or a static;

providing a first configuration description file defining a second communication configuration mode between the first programmable electronic device and said further programmable electronic device, said second communication configuration mode being opposite to the first mode;

converting, via a computer in a second network, the first configuration description file into a converted configuration description file defining communication configurations between the first programmable electronic device and said further programmable electronic device according to the first communication configuration mode; and providing said converted configuration description file to said further programmable electronic device.

2. The configuration method of claim 1, further comprising:

employing the converted file to configure at least the further programmable electronic device.

3. The configuration method of claim 1, wherein the first configuration description file defines a dynamic mode and the converted file defines a static mode.

4. The configuration method of claim 1, further comprising:

providing a second programmable electronic device adapted to communicate with said further programmable electronic device to exchange at least one of data and messages;

providing a second configuration description file defining communications between said second and further devices according to said second mode; and generating via computer a third file by performing a merging of data included in said first and second files, wherein processing the first file comprises processing via computer said third file to convert it into the converted configuration description file defining communications between the first programmable electronic device and said further programmable electronic device and the second programmable electronic device and said further programmable electronic device according to the first communication configuration mode.

5. The configuration method of claim 1, wherein said second programmable electronic device has a functionality different from a further functionality of the first programmable electronic device.

6. The configuration method of claim 1, wherein providing at least one of the first programmable electronic device and the second programmable electronic device comprises providing at least one device of a group consisting of: Intelligent Electronic Device, protection device, control unit, controller apparatus, connectivity server.

7. The configuration method of claim 1, wherein the first programmable electronic device is an Intelligent Electronic Device and the further device is a connectivity server or a controller apparatus.

8. The configuration method of claim 1, wherein communications between the first programmable electronic device and the further device are connection oriented.

9. The configuration method of claim 4, wherein the first programmable electronic device, the second programmable electronic device, and the further device of the electricity or automation system are structured and configured to be compliant with IEC 61850 standard, and wherein the first configuration communication file, the second configuration communication file, the merged file, and the converted file are Substation Configuration Description files in accordance with the IEC 61850 standard.

10. The configuration method of claim 1, wherein conversion processing of the first configuration communication file includes processing communication data indicating a communication identifier of the further device.

11. The configuration method of claim 3, wherein the first configuration communication file comprises:
a first section relating to the first programmable electronic device and defining a name of a data to be transmitted to the further programmable electronic device; and
a second section relating to the further programmable electronic device and indicating said data name to be received at said further programmable electronic device from the first programmable electronic device.

12. The configuration method of claim 10, wherein the first configuration communication file comprises:
a first section relating to the first programmable electronic device and defining a name of a data to be transmitted to the further programmable electronic device; and
a second section relating to the further programmable electronic device and indicating said data name to be received at said further programmable electronic device from the first programmable electronic device.

13. The configuration method of claim 11, wherein the conversion processing further comprises:
adding in a recipient identifier field of said first section of the converted file the communication identifier of the further programmable electronic device; and
removing said data name from the second section of the converted file.

14. The configuration method of claim 1, wherein said electricity or automation system is one of the following: an electrical generation system, an electrical transmission system, an electrical distribution system, an electrical substation of an electricity system.

15. The configuration method of claim 4, wherein providing the first and the second communication configuration files comprises generating by means of a at least one software Substation Configuration Tool, SCT, said first and second files.

16. The configuration method of claim 4, further comprising:
configuring via the computer the first and second programmable electronic devices.

17. A computer program product configured to be in communicable contact with at least one computer and having software code portions recorded thereon, which when executed by the at least one computer, the software code portions cause the at least one computer to execute a method comprising:

acquiring a first configuration description file defining communications between a first programmable electronic device in a first network and a further programmable electronic device of an electricity system according to a first communication configuration mode which is dynamic or a static;
processing the first file in a second network to convert it into a converted configuration description file defining communications configuration between the first and further devices according to a second mode opposite to the first mode; and
providing said converted configuration description file to said further programmable electronic device.

18. The computer program product of claim 17, wherein the first mode is dynamic and the second communication configuration mode is static.

19. The computer program product of claim 18, wherein the first communication configuration file comprises:
a first section relating to the first programmable electronic device and defining a name of a data to be transmitted to the further programmable electronic device; and
a second section relating to the further programmable electronic device and indicating said data name to be received at said further programmable electronic device from the first programmable electronic device.

20. The computer program product of claim 19, wherein the conversion processing further comprises:
adding in a recipient identifier field of said first section of the converted file the communication identifier of the further programmable electronic device; and
removing said data name from the second section of the converted file.

21. The configuration method of claim 1, wherein:
in the static mode:
identifiers of the first programmable electronic device are expressly indicated and stored in configuration information of the further programmable electronic device, and
in the dynamic mode:
identifiers of further programmable electronic devices are determined from a list stored in configuration information of the first programmable electronic device.

22. The computer program product of claim 17, wherein:
in the static mode:
identifiers of the first programmable electronic device are expressly indicated and stored in configuration information of the further programmable electronic device, and
in the dynamic mode:
identifiers of further programmable electronic devices are determined from a list stored in configuration information of the first programmable electronic device.

* * * * *